United States Patent [19]

White

[11] Patent Number: 5,011,464
[45] Date of Patent: Apr. 30, 1991

[54] TWO-SPEED AUTOMATIC TRANSMISSION
[75] Inventor: Robert C. White, San Diego, Calif.
[73] Assignee: Sundstrand Corporation, Rockford, Ill.
[21] Appl. No.: 498,211
[22] Filed: Mar. 23, 1990
[51] Int. Cl.[5] .............................. F16H 3/44
[52] U.S. Cl. ................... 475/260; 475/259; 475/324
[58] Field of Search .................. 475/258–262, 475/323, 324; 74/336 R; 192/105 C, 103 A

[56] References Cited

U.S. PATENT DOCUMENTS

| 1,192,704 | 7/1916 | Stobe | 475/260 X |
|---|---|---|---|
| 1,621,915 | 3/1927 | Weston | 475/260 X |
| 1,670,438 | 5/1928 | Coleman | 475/262 |
| 1,969,661 | 8/1934 | Nardone | 74/336 R |
| 2,022,689 | 12/1935 | Rainsford | 475/262 |
| 2,051,187 | 8/1936 | Strigl | 475/259 X |
| 2,097,011 | 10/1937 | Athimon | 74/336 R |
| 2,167,953 | 8/1939 | Lafleche | 475/260 |
| 2,263,707 | 11/1941 | Strigl | 475/258 X |
| 2,348,716 | 5/1944 | Banker | 475/261 |
| 3,545,305 | 12/1970 | Friend | 74/789 |
| 3,702,084 | 11/1972 | Kepple et al. | 475/186 |
| 4,412,460 | 11/1983 | Barthelemy | 475/256 |
| 4,862,770 | 9/1989 | Smith | 475/324 |

FOREIGN PATENT DOCUMENTS

| 45089 | 1/1932 | Denmark | 475/262 |
|---|---|---|---|
| 877955 | 1/1943 | France | 475/262 |
| 56-49446 | 5/1981 | Japan | 475/260 |
| 70887 | 12/1930 | Switzerland | 475/262 |
| 766157 | 1/1957 | United Kingdom | 475/262 |

Primary Examiner—Dwight Diehl
Attorney, Agent, or Firm—Antonelli, Terry, Stout & Kraus

[57] ABSTRACT

A two-speed centrifugally shifted automatic transmission provides an overdrive output shaft rotational speed that may be three times the rotational speed of the input shaft (12). A shift point at a partial speed may provide a direct drive through an overrunning clutch (33). A spline mounted shift engagement ring (46) is adapted to slide axially within housing (10) to restrain planet carrier ring (36) from rotating at start-up. After reaching a predetermined input shaft rotational speed, the shift engagement ring (46) moves to its extreme left position (FIG. 1), thereby allowing the planet carrier ring (36) to rotate and the rotational speed of the output shaft (14) to be driven by the overrunning clutch (33).

12 Claims, 3 Drawing Sheets

TWO-SPEED AUTOMATIC TRANSMISSION

TECHNICAL FIELD

This invention relates to a two-speed centrifugally shifted automatic transmission of the type where the overdrive speed ratio occurs at a start-up and a direct drive occurs when the rotational speed of the input drive shaft increases to a predetermined rotational speed.

BACKGROUND ART

Two-speed transmissions of the general type here disclosed are useful for transmitting shaft rotation to drive engine accessories such as alternators, air injection pumps or the like as mentioned in Kepple et al U.S. Pat. No. 3,702,084 and Barthelemy, U.S. Pat. No. 4,412,460.

DISCLOSURE OF INVENTION

It is an object of this invention to provide a novel two-speed transmission adapted for use in the aircraft industry where reliability, light weight and power per cubic inch are matters of primary concern.

The present invention is characterized by a novel shifting system for a planetary gearing arrangement which has a planet carrier that is either caged or allowed to freely rotate. When the planet carrier is caged, the output shaft rotational speed exceeds the rotational speed of the input shaft. A speed change mechanism allows rotation of the planet carrier in response to rotational speeds of the input shaft which exceed a predetermined magnitude. When the planet carrier is uncaged, the input to output shaft speed ratio is 1 to 1.

A further object is to provide a member mounted for axial sliding movement that is spring biased toward a planet carrier at a start-up condition and is caused to move in an axial direction away from the planet carrier in response to the centrifugal force of flyweights which act in opposition to the bias force of the spring. As the rotational speed of the input shaft is reduced, the slide member returns to its original position.

A yet further object of the invention is to provide a novel quick acting mechanism for causing the shift action to be positive and to reduce danger of damage to face gear teeth which are engaged during a shifting action.

These and other objects of the invention will become more fully apparent from the claims and from the specification as it proceeds in conjunction with the drawings.

BEST MODE OF CARRYING OUT THE INVENTION

Figure 1:
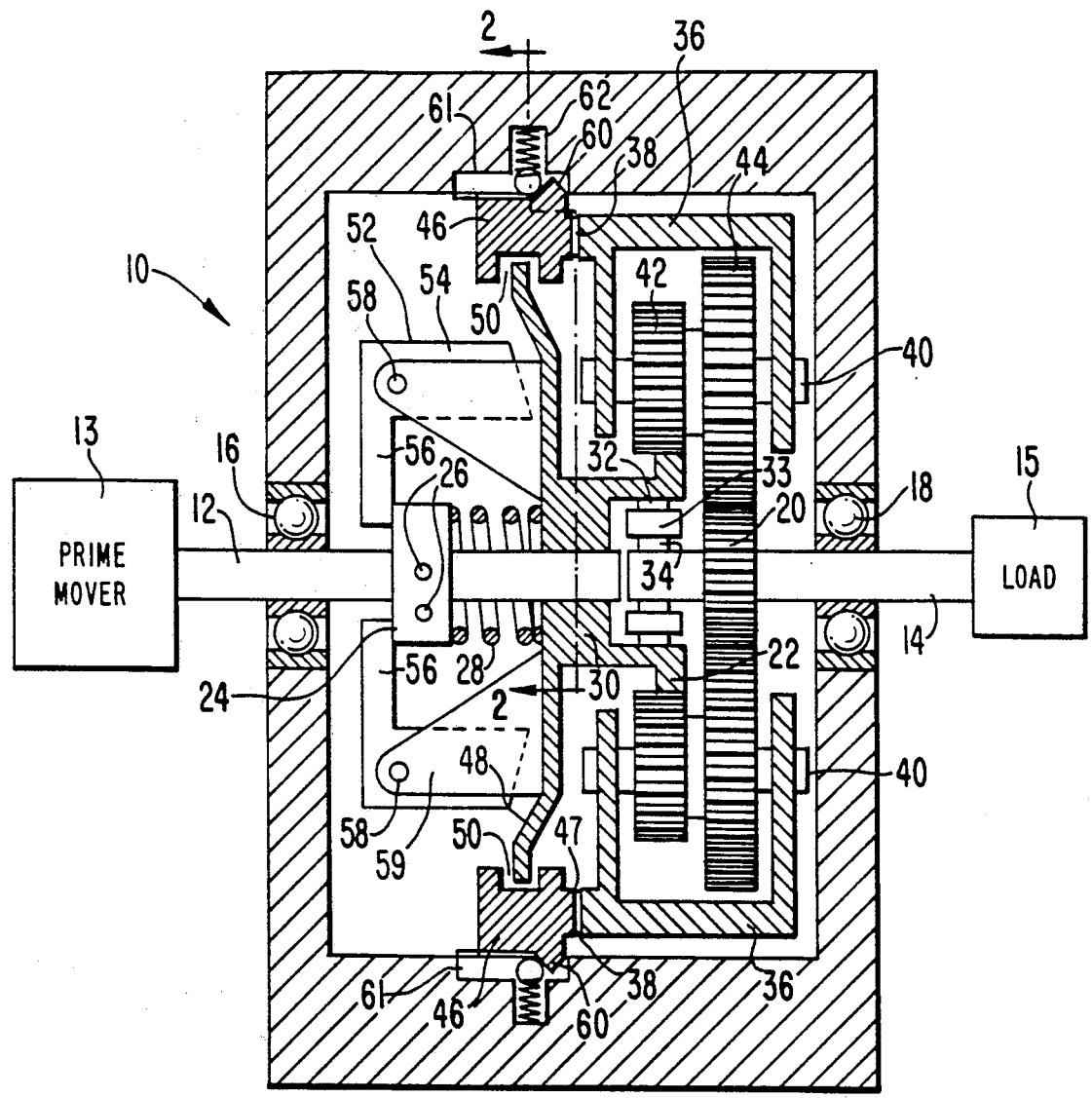
FIG. 1 is a front elevation in section which shows the transmission of the present invention being connected between a prime mover and a load in an aircraft environment.

Referring to the drawings, housing 10 is shown to have a cylindrical shape and a length smaller than its diameter to provide a compact size and shape. Input shaft 12 is connected to an prime mover 13 which may be a gas turbine in an airframe but is not limited thereto. Input shaft 12 and output shaft 14 are axially aligned and journaled at the housing end walls by bearings 16 and 18. The output shaft 14 drives a load 15 which may be, but is not limited to, a fuel pump in an airframe. A driven sun gear 20 is secured to the output shaft 14. The drive sun gear 22 is splined on an inner end of the input shaft 12 and is capable of axial sliding movement along its shaft 12.

Collar 24 is secured to input shaft 12 as by fasteners 26 and maintains compression spring 28 between the slidable hub 30 of drive gear 22 and collar 24. Secured to the inner annular surface of drive gear 22 is an outer race 32 of an over-running or one-way clutch which has its inner race 34 secured to the output shaft 14. Any suitable one-way clutch of known type may be used.

The planetary gear assembly includes planet carrier ring 36 which has small gear teeth 38 on a side face. Radially inwardly, the planet carrier supports a plurality of journaled pinon shafts 40, each of which carries small and large planet gears 42, 44 that engage drive sun gear 22 and driven sun gear 20 respectively.

When planet carrier ring 36 is caged or locked against rotation, the drive gear 22 drives small planet gear 42 at a ratio of, for example, 3:5 and the large planet gear 44 drives the driven gear at a ratio of, for example, 5:9 to thereby give an overdrive ratio of 1:3 which is useful in fulfilling the starting requirements of an engine driven generator or for a early cut-in gas turbine auxiliary power unit fuel pump 15. It is apparent that these gear ratios are exemplary and that other gear ratios may be used.

Locking of the planet carrier ring 36 is controlled by the axial positioning of shift engagement ring 46 which is a non-rotating slide member that has projections 60 adapted for axial sliding movement in grooves 61 of housing 10. On the side facing planet carrier ring gear teeth 38 are meshing gear teeth 47 which, in the position illustrated in FIG. 1, lock the planet carrier ring 36 against rotation.

Shift engagement ring 46 may be axially moved to the left as viewed in FIG. 1 to thereby release planet carrier ring 36. When planet carrier ring 36 is free to rotate, the rotational speed of the output shaft 14 gradually reduces to the same speed as the rotational speed of the input shaft 12, but not lower because of the one-way clutch 33 which provides a direct drive between the input and output shafts 12, 14.

Drive gear 22 extends from a hub 30 which also carries a radially extending member 48 that has a radially extending outer end which may fit in a slot 50 in the shift engagement ring 46 to control the axial position of the shift engagement ring 46 in accordance with the axial position of hub 30.

Flyweights 52 may be L-shaped with one leg 54 being subject to outward radial movement due to centrifugal force. Outward movement of leg 54 causes the other leg 56 to pivot about pin 58 and press in an axial direction against collar 24. Pins 58 are attached to flyweight supports 59 which in turn are rigidly secured to radially extending member 48 which is supported by hub 30. Since collar 24 is secured relative to the axial position of input shaft 12, the centrifugal force of the flyweight 52 causes hub 30 to move to the left as viewed in FIG. 1 as a consequence of high speed rotation of input shaft 12.

Figure 3:
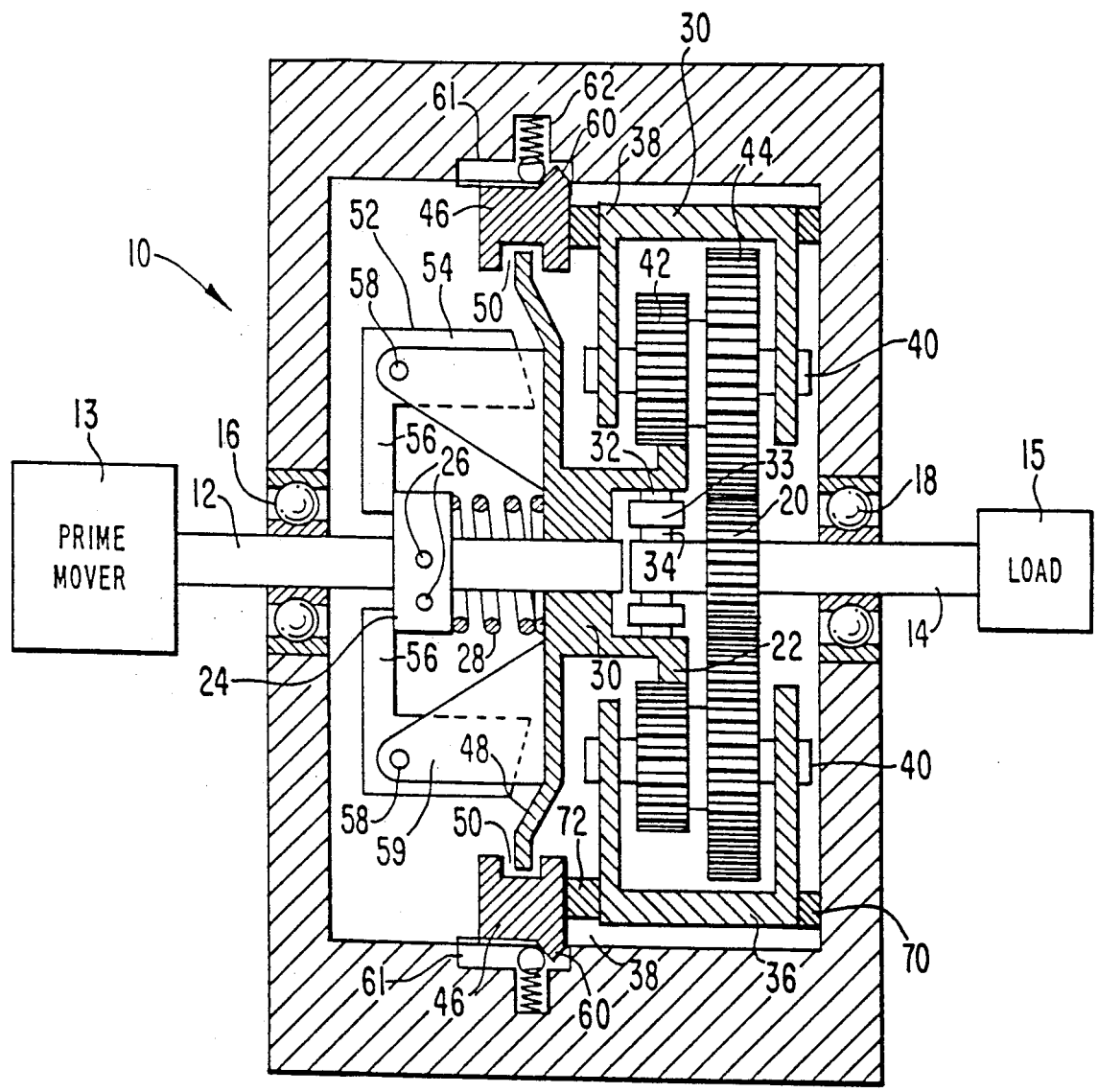
FIG. 3 is an alternative embodiment of the present invention.

At low speed, it is important that the transmission return to the overdrive mode of operation. At some predetermined low rotational speed of input shaft 12, the shift point is reached whereby the facing teeth 38 on the planet carrier ring and the gear teeth 47 on the shift engagement ring are caused to engage. To reduce the shock associated with this engagement, a synchronizer may be employed, or friction surfaces as illustrated in FIG. 3 may be used in lieu of gear teeth 38 and 47. In the illustrated embodiment, an arrangement is disclosed which may safely shift at a low speed of about 5% of the rated shaft rotational speed.

A plurality of projections 60 are provided on the outer surface of shift engagement ring 46 which extend into axial grooves 61 of housing 10. Radially directed holes in the axial grooves 61 of housing 10 have inserted therein a ball and spring assembly 62 that is positioned to engage each projection 60 as the projections 60 move in their axial path in a groove 61. The projections 60 have leading and trailing walls that are sloped to allow the ball to roll up one wall, over the apex and down the other wall to provide a positive quick action which is effective to engage or disengage the gear teeth 38 and 47.

The amount of force required to cause the ball to traverse a wall depends upon the height of the projection 60 and the spring constant of the ball and spring assembly 62. As the rotational speed of the input shaft 12 increases, the force on the hub 30 will exceed the combined forces of compression spring 28 and that due to the resistance of the ball and spring assemblies 62 at which point the shift engagement ring 46 abruptly moves to the left as viewed in FIG. 1 thereby freeing the planet carrier 36 to decelerate down to the speed of the input shaft. This causes the overrunning clutch 33 to engage.

As the rotational speed of the input shaft decelerates, the compression spring 28 pushes the flyweight arms 54 back toward the center of the input drive shaft 12. As the rotational speed of the input drive shaft 12 further decreases, the force from the compression spring 28 will exceed the resistance of the ball and spring assemblies 62 and the shift engagement ring 46 will be pushed to the right as viewed in FIG. 1 thereby re-engaging the planet carrier spring 36 with the shift engagement ring 46. This re-establishes the speed increase ratio to 1:3 in the example discussed above.

With the use of such a device, a large operating differential can be provided which not only reduces hunting, but can accomplish quieter shifting and improve the life of the face gear teeth 38 and 47. With the illustrated embodiment, the down shift into direct drive can occur at a rotational speed of the input shaft that is about 35% of rated speed and an upshirt to re-establish the 1:3 ratio at about 5% of rated speed.

Figure 2:
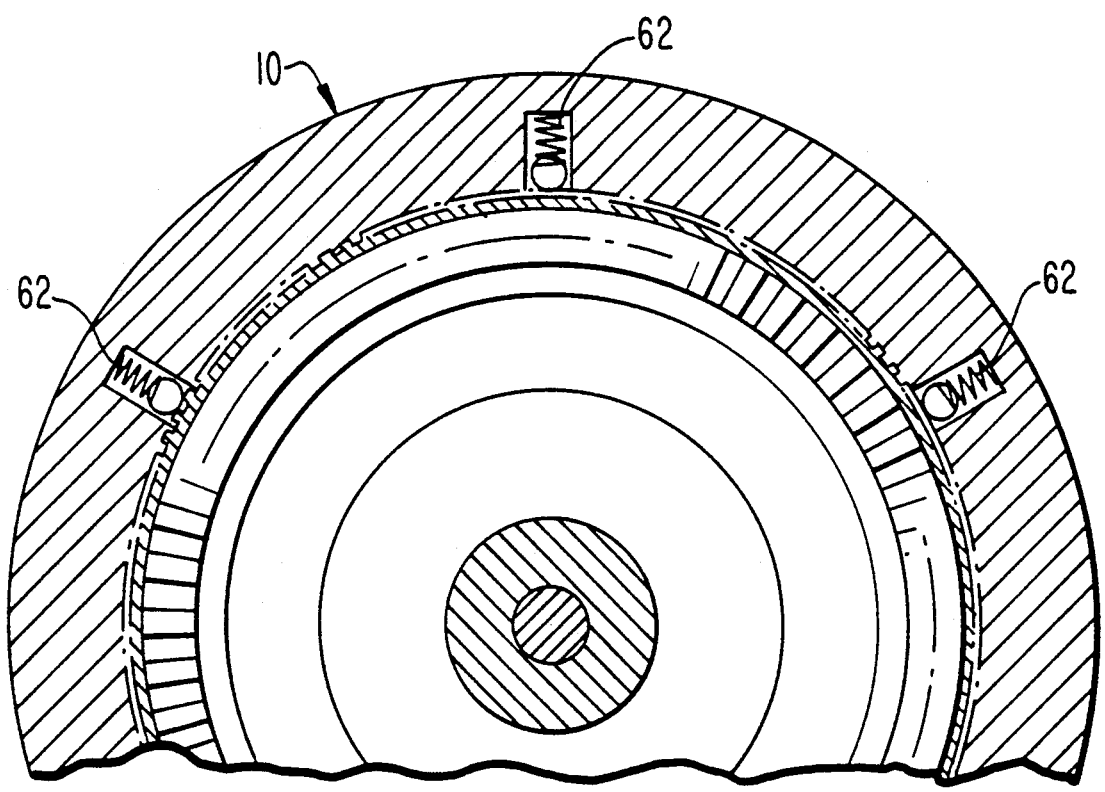
FIG. 2 is a partial end view taken along line 2—2 of FIG. 1.

FIG. 3 illustrates a second embodiment of the present invention. Like reference numerals identify like parts in FIGS. 1-3. In the second embodiment, the teeth 38 and 47 of FIG. 1 which are used to restrain the planet carrier 36 are replaced with a pair of annular friction elements 70 and 72 which are respectively carried by an inner wall of the housing 10 and an opposed surface of the shift engagement ring 46. The teeth 38 have been replaced with a smooth machined surface which contacts the annular friction element 72. When the shift engagement ring 46 moves to the right past the spring and ball assembly 62, smooth engagement occurs between the shift engagement ring 46 and the planet carrier.

It is apparent that other modifications incorporating the principles of the present invention may be devised. All modifications and equivalents which fall within the scope of the claims are intended to be covered thereby.

What is claimed is:

1. A two speed transmission comprising:
   an input shaft having a drive sun gear adapted to rotate about an axis;
   an output shaft having a driven sun gear;
   a planetary gear assembly having a planet carrier supporting a shaft containing a plurality of gears for engagement with said drive and driven sun gears respectively;
   a clutch which prevents the output shaft from rotating at a rotational speed less than the instantaneous rotational speed of the input shaft; and
   a speed change mechanism including a non-rotating slide member which axially shifts in response to input shaft speed between a first axial position and a second axial position, said first axial position being effective to engage the planet gear carrier to prevent rotation of the planet gear carrier thereby to drive the output shaft at a rotational speed greater than the rotational speed of the input shaft, and said second axial position being effective to allow said planet gear carrier to rotate freely and the clutch to drive the output shaft at the rotational speed of the input shaft.

2. A transmission as defined in claim 1 wherein the speed change mechanism includes:
   a hub that is spline mounted on said input shaft and supports flyweights and a radially extending member for affecting movement of said slide member between said first and second positions;
   a spring normally biasing said hub so that the slide member is at said first position when the input shaft is not rotating; and
   means mounting said flyweights to produce a force in opposition to the spring biasing force on said hub, said produced force being effective at input shaft rotational speeds which exceed a predetermined magnitude to move said hub so that the slide member is at said second position.

3. The transmission as defined in claim 2 wherein:
   the flyweights have a configuration so that a displacement in a radial direction due to centrifugal force produces an axially directed force;
   the spring comprises a coil spring which surrounds said input shaft and is positioned between a collar fixed on said input shaft and said hub; and
   the hub is adapted to be displaced toward the collar by the radial displacement of the flyweights.

4. The transmission as in claim 3 wherein:
   one of the slide member and the planet carrier carries a first friction member and an opposed inner wall of a housing carries a second friction member which members engage the planet carrier in the first position;
   said slide member has a plurality of radially outwardly extending projections having sloping sidewall faces facing the direction of axial movement of said slide member;
   a plurality of separate ball and spring assemblies are flexibly positioned to engage both side wall surfaces of said projection as the projections are moved by movement of said hub; and
   said flyweight force is adequate to overcome the combined forces of said compression spring and said ball and spring assemblies to effect disengagement of said forcing gear.

5. The transmission as defined in claim 4 wherein the spring force of said compression spring exceeds the combined forces of said ball and spring assemblies acting on said projections to produce a quick action to engage said facing gear teeth to accomplish quiet shifting and prolonged life of the facing gear teeth.

6. The transmission as defined in claim 5, wherein the relative spring forces of said compression spring and said ball and spring assemblies are such as to cause engagement of said facing gear teeth at a rotational speed of the input shaft no higher than about 5% of the input shaft rated speed.

7. The transmission as defined in claim 3 wherein:
said planet gear carrier and said slide member have facing gear teeth which are engaged when the slide member is at said first position;
said slide member has a plurality of radially outwardly extending projections having sloping sidewall surfaces facing the direction of axial movement of said slide member;
a plurality of separate ball and spring assemblies are fixedly positioned to engage both side wall surfaces of said projections as the projections are moved by movement of said hub; and
said flyweight force is adequate to overcome the combined forces of said compression spring and said ball and spring assembles to effect disengagement of said facing gear teeth.

8. The transmission as defined in claim 7 wherein the spring force of said compression spring exceeds the combined forces of said ball and spring assemblies acting on said projections to produce a quick action to engage said facing gear teeth to accomplish quiet shifting and prolonged life of the facing gear teeth.

9. The transmission as defined in claim 8 wherein the relative spring forces of said compression spring and said ball and spring assemblies are such as to cause engagement of said facing gear teeth at a rotational speed of the input shaft no higher than about 5% of the input shaft rated speed.

10. In an automatic transmission adapted when shifting to engage and disengage facing gear teeth on respective parts of an axially fixed rotating member and of an axially movable non-rotating slide member,
a housing in which said members are mounted and supporting axially aligned input and output shafts;
a hub that is spline mounted on said input shaft and that supports flyweights and a radially extending member having an end for controlling the axial position of said non-rotating member;
a collar secured at a fixed axial position on said drive shaft;
a compression spring positioned to separate said collar said drive shaft;
said axially movable non-rotating slide member having a plurality of radially outwardly extending projections with each projection having opposed sloping sidewall surfaces facing the direction of axial movement;
a plurality of separate ball and spring assemblies positioned in said housing to engage both sloping side wall surfaces of said projections as the projections are moved axially by movement of said hub; and
means associated with said flyweights to produce a force directed in opposition to the force of said compression spring in response to input shaft rotational speeds above a predetermined value, said flyweight force being sufficient to overcome the combined forces of said compression spring and said ball and spring assemblies to effect disengagement of said facing gear teeth.

11. The transmission as defined in claim 10 wherein the spring force of said compression spring exceeds the combined forces of said ball and spring assemblies acting on said sloping side wall surfaces to produce a quick action for engagement of said gear teeth to accomplish quite shifting and long life of facing gear teeth.

12. The transmission as defined in claim 11 wherein the relative spring forces of said compression spring and said ball and spring assemblies acting on said sloping side wall surfaces are such as to effect engagement of said facing gear teeth at a rotational speed of the input shaft no higher than about 5% of the input shaft rated speed.

* * * * *